(12) United States Patent
Kato et al.

(10) Patent No.: US 7,037,444 B2
(45) Date of Patent: May 2, 2006

(54) PHOTO-RESPONSIVE LIQUID CRYSTAL COMPOSITION

(75) Inventors: Takashi Kato, Kawasaki (JP); Qi Song, Bunkyo-ku (JP); Masaya Moriyama, Adachi-ku (JP); Norihiro Mizoshita, Nagoya (JP)

(73) Assignee: JSR Corporation, Tokyo (JP)

( * ) Notice: Subject to any disclaimer, the term of this patent is extended or adjusted under 35 U.S.C. 154(b) by 0 days.

(21) Appl. No.: 11/085,171

(22) Filed: Mar. 22, 2005

(65) Prior Publication Data

US 2005/0218374 A1    Oct. 6, 2005

(30) Foreign Application Priority Data

Mar. 30, 2004 (JP) ............................. 2004-097718

(51) Int. Cl.
  *C09K 19/52* (2006.01)
  *C09K 19/54* (2006.01)

(52) U.S. Cl. .................. 252/299.01; 252/299.5

(58) Field of Classification Search ........... 252/299.01, 252/299.5
See application file for complete search history.

(56) References Cited

U.S. PATENT DOCUMENTS

| 6,074,710 | A  | * | 6/2000 | Kato et al. ............... 428/1.5 |
| 6,333,081 | B1 | * | 12/2001 | Horikiri et al. ............ 428/1.1 |
| 6,682,787 | B1 | | 1/2004 | Kato et al. |
| 6,740,255 | B1 | | 5/2004 | Kato et al. |
| 6,913,709 | B1 | * | 7/2005 | Harada et al. ......... 252/299.01 |

FOREIGN PATENT DOCUMENTS

| EP | 1 236 785 A2 | 9/2002 |
| EP | 1 338 639 A1 | 8/2003 |
| JP | 11-256164 | * 9/1999 |
| JP | 2002-249780 | 9/2002 |
| JP | 2003-238962 | 8/2003 |

OTHER PUBLICATIONS

English Translation by computer for JP 11-256164, http://www4.ipdl.ncipi.go.jp/Tokujitu/PAJdetail.ipdl?N0000=60&N0120=01&N2001=2&N3001=H11-256164.*

Masaya Moriyama, et al., "Photoresponsive Anisotropic Soft Solids: Liquid-Crystalline Physical Gels Based on a Chiral Photochromic Gelator", Adv. Mater. vol. 15, No. 16 Aug. 15, 2003, pp. 1335-1338.

Masaya Moriyama, et al., "Photostimulated structural changes of liquid crystal physical gels", Proceedings of SPIE, vol. 5518, pp. 160-169.

Xia Tong, et al., "Self-assembled cholesteric liquid crystal gels: preparation and scattering-based eletrooptical switching", Journal of Materials Chemistry, vol. 13, No. 6, 2003, XP-002338936, pp. 1491-1495.

Yue Zhao, et al., "Light-induced reorganization in self-assembled liquid crystal gels: electrically switchable diffraction gratings", Advanced Materials, vol. 15, No. 17, Sep. 2003, XP-002338937, pp. 1431-1435.

\* cited by examiner

*Primary Examiner*—Shean C. Wu
(74) *Attorney, Agent, or Firm*—Oblon, Spivak, McClelland, Maier & Neustadt, P.C.

(57) ABSTRACT

Disclosed is a novel photo-responsive liquid crystal composition in which an oriented state of a liquid crystalline compound is capable of being controlled by an irradiation of light. The photo-responsive liquid crystal composition is composed of a liquid crystalline compound and a gelling agent mixed with the liquid crystalline compound to form a gelling mixture, wherein the liquid crystalline compound is capable of being controlled in a state orientated in one direction by the irradiation of light. In the photo-responsive liquid crystal composition, the liquid crystalline compound is oriented in a direction parallel to the direction of the irradiation of light. In the photo-responsive liquid crystal composition, the gelling agent is formed of a compound having an azobenzene structural part and a specific skeletal structure.

17 Claims, 1 Drawing Sheet

PHOTO-RESPONSIVE LIQUID CRYSTAL COMPOSITION

BACKGROUND OF THE INVENTION

Field of the Invention

The present invention relates to a photo-responsive liquid crystal composition composed of a gelling agent mixed with a liquid crystalline compound or the like to form a gelling mixture and a liquid crystalline compound, and having a photo-induced orientation ability of the liquid crystalline compound.

In recent years, as the gelling agent, attention has been attracted to that formed of self-organizing low molecules which form a fibrous coalescence by coalescing molecules in the form of fibers by an intermolecular interaction.

Such gelling agent is expected as a material for making up a liquid crystal physical gel having both properties of liquid crystal such as an optical anisotropy and an electric-field responsivity, and a property of physical gel. As the liquid crystal physical gel using the gelling agent, a liquid crystal composition composed of, for example, the gelling agent and the liquid crystalline compound has been proposed. (For example, see, Japanese Patent Application Laid-Open No. 2002-249780). Such liquid crystal physical gel is that changes an organized structure thereof by an external stimulation such as temperature or electric field.

As the liquid crystal physical gel which utilizes light as the external stimulation, a photo-responsive liquid crystal composition utilizing an azobenzene compound which is a photochromic compound as the gelling agent has been proposed. (For example, see Japanese Patent Application Laid-Open No. 2003-238962).

However, there have not been known any liquid crystal composition which achieved a photo-induced orientation of the liquid crystalline compound as the function thereof, as the liquid crystal composition having a photo-responsivity and composed of a liquid crystalline compound and a photo-responsive low molecular gelling agent.

SUMMARY OF THE INVENTION

The present invention has been accomplished as the result of repeated researches as to changes in an organized structure of a liquid crystal composition composed of a gelling agent and a liquid crystalline compound caused by a stimulation of light, and to self-organizing low molecules forming fibrous coalescence which are used as the gelling agent. The present invention has as its object the provision of a novel photo-responsive liquid crystal composition, in which an oriented state of the liquid crystalline compound is capable of being controlled by an irradiation of light.

According to the present invention, there is thus provided a photo-responsive liquid crystal composition composed of a liquid crystalline compound and a gelling agent mixed with the liquid crystalline compound to form a gelling mixture, wherein the liquid crystalline compound is capable of being controlled in a state oriented in one direction by an irradiation of light.

In the photo-responsive liquid crystal composition according to the present invention, the liquid crystalline compound is oriented in a direction parallel to the direction of the irradiation of light.

In the photo-responsive liquid crystal composition according to the present invention, the gelling agent may preferably be formed of a compound having an azobenzene structural part and a skeletal structure represented by the following general formula (1):

General formula (1)

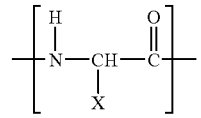

wherein X indicates a monovalent organic group.

In the photo-responsive liquid crystal composition according to the present invention, the gelling agent may preferably be formed of an isoleucine derivative having an azobenzene structural part and a skeletal structure represented by the following formula (1):

Formula 1

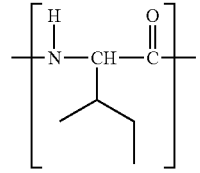

In the photo-responsive liquid crystal composition according to the present invention, the gelling agent may preferably be formed of an isoleucine derivative represented by the following general formula (2):

General formula (2)

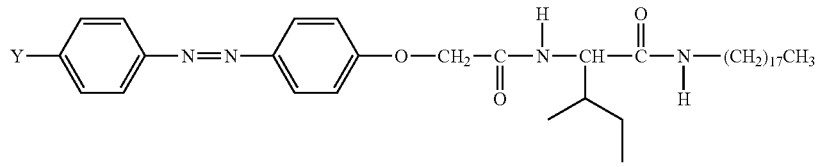

wherein Y indicates a monovalent group.

In the photo-responsive liquid crystal composition according to the present invention, the liquid crystalline compound may preferably be formed of a compound exhibiting a nematic phase.

In the photo-responsive liquid crystal composition according to the present invention, the liquid crystalline compound may preferably be 4-pentyl-4'-cyanobiphenyl, and the gelling agent may preferably be an isoleucine derivative represented by the following general formula (2):

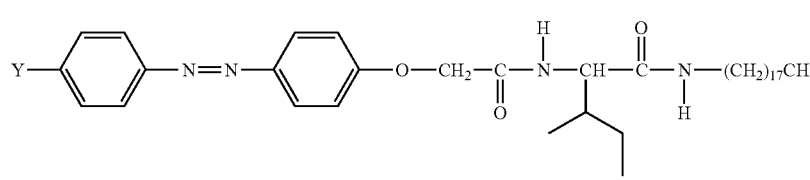

General formula (2)

wherein Y indicates a monovalent group.

The photo-responsive liquid crystal composition according to the present invention is a novel liquid crystal composition having a photo-induced orientation ability, in which an oriented state of the liquid crystalline compound is capable of being controlled by an irradiation of light.

BRIEF DESCRIPTION OF THE DRAWINGS

The above and other objects, features and advantages of the present invention will become apparent from the following description and the appended claims, taken in conjunction with the accompanying drawings, in which:

DETAILED DESCRIPTION OF THE PREFERRED EMBODIMENTS

Figure 1:
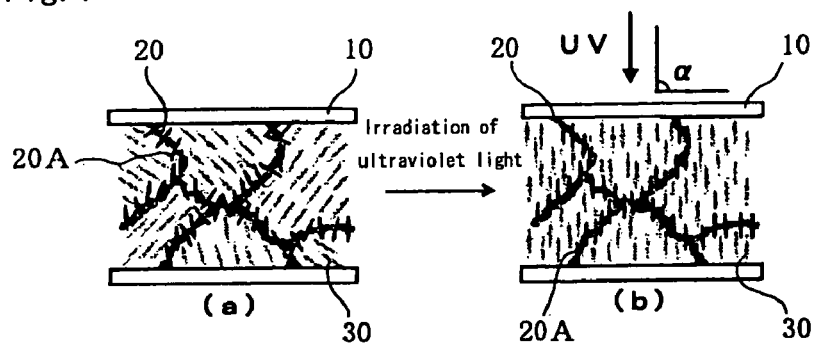
FIG. 1 is a pattern diagram for explanation illustrating a state of the photo-responsive liquid crystal composition of the present invention sealed in the glass cell, (a) is a pattern diagram illustrating a state that a fibrous coalescence of gelling agent is formed and before irradiation of the ultraviolet light, and (b) is a pattern diagram illustrating a state after irradiation of the ultraviolet light.

The embodiments of the present invention will hereinafter be described in details.

The photo-responsive liquid crystal composition according to the present invention is composed of a liquid crystalline compound and a gelling agent mixed with the liquid crystalline compound to form a gelling mixture, and have a photo-induced orientation ability about the liquid crystalline compound.

As a preferable specific example of the photo-responsive liquid crystal composition according to the present invention, may be mentioned a liquid crystal composition composed of a liquid crystalline compound (hereinafter also referred to as "specific liquid crystalline compound") exhibiting a nematic phase and a gelling agent formed of a compound having an azobenzene structural part as well as the skeletal structure represented by the above general formula (1).

In the general formula (1) representing the skeletal structure according to the compound making up the gelling agent, X indicates a monovalent organic group. As the monovalent organic group making up X, is preferably a sec-butyl group.

As the specific liquid crystalline compound, may be used those exhibiting a nematic phase at room temperature such as, cyanobiphenyl compounds, phenylcyclohexane compounds, benzylideneaniline compounds, phenylbenzoate compounds, phenylacetylene compounds and phenylpyrimidine compounds.

As preferable specific examples of the specific liquid crystalline compound, may be mentioned cyanobiphenyl compounds such as 4-pentyl-4'-cyanobiphenyl, benzylideneaniline compounds such as 4-methoxybenzylidene-4'-butylaniline, phenylcyclohexane compounds such as 4-(trans-4-pentylcyclohexyl)benzonitrile and the like, and among these, 4-pentyl-4'-cyanobiphenyl is particularly preferred.

As the gelling agent, may be used compounds of specific molecular structure having a group (hereinafter also referred to as "hydrogen bond forming group") capable of forming an intermolecular hydrogen bond formed of a group formed of combination of —NH— group and —CO— group, and azobenzene structural part. Among these compounds, may suitably be used those formed of an isoleucine derivative having the azobenzene structural part as well as the skeletal structure represented by the above formula (1).

As preferable specific examples of the gelling agent, may be mentioned those formed of the isoleucine derivative (hereinafter also referred to as "specific isoleucine derivative") represented by the above general formula (2).

In the general formula (2) representing the specific isoleucine derivative, Y indicates a monovalent group. As the monovalent group making up Y, may be mentioned for example, cyano group, nitro group, methoxy group, alkyl group, chloro group, bromo group, iodo group and the like.

Among these, cyano group is preferable as group Y.

The gelling agent formed of the isoleucine derivative having an azobenzene structural part as well as the skeletal structure represented by the above general formula (1), may be produced by obtaining the isoleucine derivative of specific molecular structure by using an isoleucine derivative (hereinafter also referred to as "material isoleucine derivative") having the skeletal structure represented by the above formula (1) and an azobenzene derivative (hereinafter also referred to as "material azobenezene derivative") represented by the following general formula (3) as raw materials, and subjecting these raw materials to a reaction under a presence of 1-ethyl-3-(3-dimethylaminopropyl)carbodiimide hydrochloride and 4-(N,N-dimethylamino)pyridine.

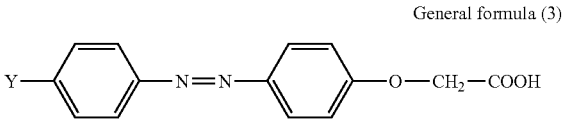

General formula (3)

In the formula, Y indicates a monovalent group.

As the monovalent group making up Y, may be mentioned the same groups as mentioned in the general formula (2).

In the reaction, a number of moles of the material isoleucine derivative and a number of moles of the material azobenzene derivative are preferably substantially the same and are preferably in the equivalent relation.

The amount of 1-ethyl-3-(3-dimethylaminopropyl)carbodiimide hydrochloride to be used is preferably 100 to 200 parts by mass per 100 parts by mass of the material isoleucine derivative.

The amount of 4-(N,N-dimethylamino)pyridine to be used is preferably 5 to 20 parts by mass per 100 parts by mass of the material isoleucine derivative.

As a solvent used in the reaction process, may be mentioned dichloromethane, tetrahydrofuran, N,N-dimethylformamide and the like.

These may be used either singly or in any combination thereof.

The amount of the solvent used is preferably 10 to 50 ml per 1 g of the material isoleucine derivative.

The reaction temperature is, for example, room temperature (25° C.), and the reaction time is, for example, 1 to 5 days.

In the following reaction formula (1), a synthetic process of the specific isoleucine derivative is shown, when the gelling agent composed of the specific isoleucine derivative is produced.

one having a photo-responsivity derived from the azobenzene structural parts which are the functional structural parts, the photo-induced orientation ability of the liquid crystalline compound is achieved as followings.

The photo-responsive liquid crystal composition of the present invention has a photo-responsivity and is capable of controlling an oriented state of the liquid crystalline compound by the irradiation of light. The photo-responsive liquid crystal composition is, by irradiating light with controlling the direction of the light irradiation to the photo-responsive liquid crystal composition in a state that fibrous coalescence is formed by the gelling agent, capable of causing the liquid crystalline compound to a state oriented to the one direction parallel to the direction of irradiation of light.

Specifically, as shown in FIG. 1, in a case where the ultraviolet light (non-polarized, a wavelength of 365 nm) is irradiated to the liquid crystal composition in a state sealed in a glass cell, for example in a direction perpendicular to the substrate 10 making up the glass cell, i.e. the irradiating angle α to the substrate 10 is 90°, a great number of liquid crystalline compound molecules 30 making up the liquid crystal composition are oriented to the one direction perpendicular to the substrate 10.

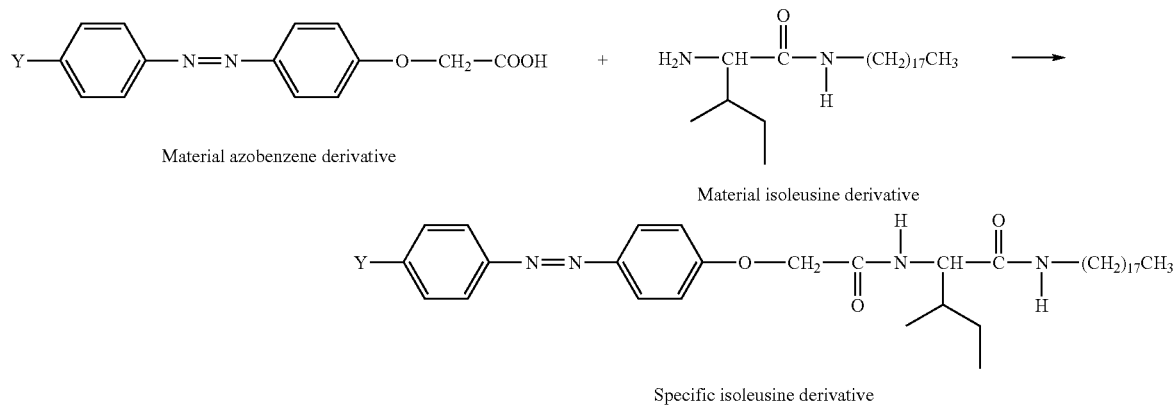

Reaction formula (1)

Material azobenzene derivative

Material isoleusine derivative

Specific isoleusine derivative

In the formula, Y indicates a monovalent group.

As the monovalent group making up Y, may be mentioned the same groups as mentioned in the general formula (2).

The gelling agent making up the photo-responsive liquid crystal composition of the present invention may also be produced by the method other than above-mentioned production method.

In the photo-responsive liquid crystal composition of the present invention, a proportion of the gelling agent varies according to the kind thereof. However, it is preferably 0.2 to 10.0 mass % per the total 100 mass % of the gelling agent and the specific liquid crystalline compound.

In the above-mentioned photo-responsive liquid crystal composition, the gelling agent becomes a fibrous coalescence formed of a great number of molecules coalesced in the form of fibers by the formation of hydrogen bonds between the molecules with the hydrogen bond forming groups, thereby gelling the whole photo-responsive liquid crystal composition to substantially remove its fluidity. Moreover, since the fibrous coalescence formed becomes the In FIG. 1, numeral FIG. 20 denotes a fibrous coalescence, 20A denotes an azobenzene structural part in the isoleucine derivative making up the fibrous coalescence 20 formed by the gelling agent.

The reason of occurrence of such phenomenon is considered as that, in the photo-responsive liquid crystal composition of the present invention, since the azobenzene compounds have trans-cis photo-isomerizing property, the trans-form thereof have a rod like molecule shape and the absorption-transition moment is approximately parallel to the longitudinal axis of the molecule, the azobenzene structural parts 20A are oriented to the state that the longitudinal axis of the molecule are aligned in the direction parallel to the direction of light irradiation as undergoing repetitive isomerizing cycle of trans-cis-trans by the irradiation of the ultraviolet light (non-polarized light), thereby, the azobenzene structural parts 20A on the fibrous coalescence 20 are photo-inducingly oriented by the irradiation of the ultraviolet light in this way and liquid crystalline molecules 30 are oriented by the effect of the photo-inducingly oriented azobenzene structural parts 20A.

Further, in the photo-responsive liquid crystal composition according to the present invention, the liquid crystalline compound is capable of continuously changing the oriented direction thereof.

Figure 2:
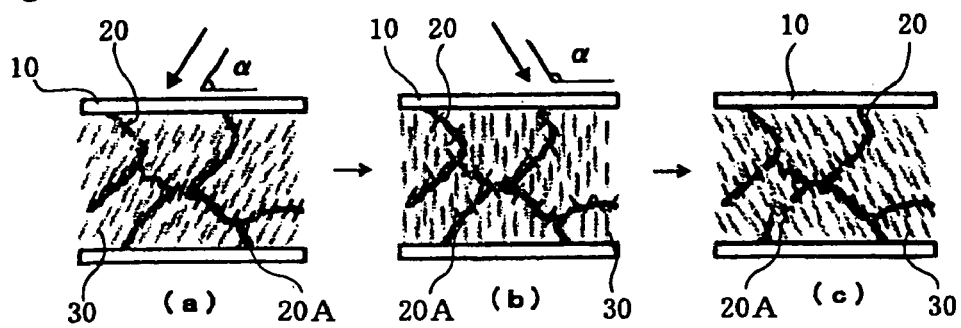
FIG. 2 is a pattern diagram for explanation illustrating a state of continuous change of a state of the photo-responsive liquid crystal composition of the present invention sealed in the glass cell.

Specifically, as shown in FIG. 2, when the ultraviolet light is irradiated to the liquid crystal composition ("a" in FIG. 2) in which the liquid crystalline compound molecules 30 are oriented in a state inclined, for example at 30° to the substrate 10 by the irradiation of the ultraviolet light, so as, the irradiating angle α to the substrate 10 becomes, for example, 150°, the liquid crystal composition is finally re-oriented to the state ("c" in FIG. 2) that the liquid crystalline compound molecules 30 are inclined at an angle of 150° through the state ("b" in FIG. 2) that the liquid crystalline compound molecules 30 are oriented in the direction perpendicular to the substrate 10.

The reason that the liquid crystalline compound molecules 30 become the state oriented in the direction perpendicular to the substrate 10 in a re-orienting process, is considered as that in the re-orienting process, those in a state inclined at an angle of 150° to the substrate 10 and those in a state inclined at an angle of 30° to the substrate 10 are coexisted as the azobenzene structural parts 20A on the fibrous coalescence 20, and in the state that azobenzene structural parts 20A of two inclined states are coexisted, the orienting force of the azobenzene structural parts 20A to the liquid crystalline compound molecules 30 is averaged.

Further, in the photo-responsive liquid crystal composition of the present invention, the liquid crystalline compound in a state being oriented by the external stimulation of light (ultraviolet light) is also capable of being changed in its oriented direction by other external stimulation than the light.

Figure 3:
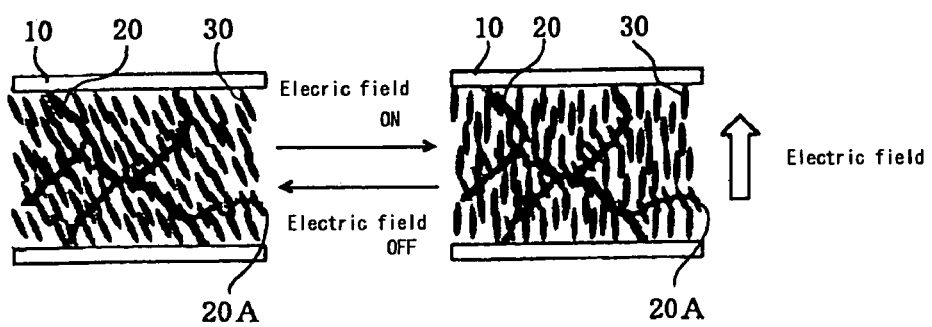
FIG. 3 is a pattern diagram for explanation illustrating a fact that a state of the photo-responsive liquid crystal composition of the present invention sealed in the glass cell changes by external stimulation.

Specifically, as shown in FIG. 3, when an electric field is applied in a direction perpendicular to the substrate 10 to the liquid crystal composition in which the liquid crystalline compound molecules 30 are oriented in an inclined state (inclined at an angle of 135° in FIG. 3) to the substrate 10 by the irradiation of the ultraviolet light, the liquid crystalline compound molecules 30 are oriented to a direction perpendicular to the substrate, and moreover, they are restored to the state before the application of the electric field, specifically to the state inclined to the substrate 10, when the application of the electric field is stopped.

In the photo-responsive liquid crystal composition of the present invention, the liquid crystalline compound is also capable of being caused to the state (cf. "a" in FIG. 1) not oriented by conducting a heating or cooling treatment of the photo-responsive liquid crystal composition in a state that the liquid crystalline compound is oriented by the external stimulation of light.

According to the above-mentioned photo-responsive liquid crystal composition of the present invention, since it has the photo-responsivity and the liquid crystalline compound is capable of being controlled to the state oriented in one direction by the irradiation of light, a novel photo-induced orienting technology can be achieved that conducting a liquid crystal orientation according to three dimensional information which is different from the conventional liquid crystal orientating technology utilizing two dimensional information using orienting film. Further, according to the composition, an excellent handling property can be obtained since macro-fluidity of the liquid crystalline compound can be controlled by self-organizing property of the gelling agent, therefore, there is possibility to suitably be used as, for example, a material of liquid crystal display device.

The present invention will hereinafter be described specifically by the following example. However, the present invention is not limited to this example.

EXAMPLE 1

Synthesizing Example 1 of Material Azobenzene Derivative

After 2.23 g (0.01 mol) of 4'-cyano-4-hydroxyazobenzene and 2.33 g (0.014 mol) of ethyl bromoacetate were dissolved in 35 ml of N,N-dimethylformamide (DMF) in a reaction vessel and 4.14 g (0.03 mol) of potassium carbonate was added into this system, the reaction mixture was stirred for 19 hours at 100° C. under argon atmosphere. Then, after exhaustion of material was confirmed by thin layer chromatography, 60 ml of ethanol, 12 ml of water and 0.7 g of potassium hydroxide were added to the raw product obtained by removing the solvent by distillation under reduced pressure and the reaction mixture was heat-refluxed for 1.5 hours. Thereafter, the reaction vessel was cooled to the room temperature, and the reaction product was acidified by adding 8 ml of 3 normality hydrochloric acid to separate deposited product by filtration, thereby obtaining 2.60 g of (4'-cyanoazobenzene-4-oxy)acetate (hereinafter also referred to as "Material azobenzene derivative (1)") of which Y is cyano group in the general formula (3) at the yield of 93%.

Synthesizing Example 1 of Material Isoleucine Derivative 2.47 g (0.007 mol) of N-[(9-fluorenyl)methoxycarbonyl]-L-isoleucine, 1.89 g (0.007 mol) of octadecylamine, 85.5 mg (0.0007 mol) of 4-(N,N-dimethylamino)pyridine (DMAP), and 1.61 g (0.0084 mol) of 1-ethyl-3-(3-dimethylaminopropyl)carbodiimide hydrochloride (EDC) was dissolved in 45 ml of dichloromethane, and the resultant solution was stirred for 4 days at room temperature. Then, the obtained reaction mixture was extracted with dichloromethane, and the organic layer was dried over anhydrous magnesium sulfate. Thereafter, the solvent was distilled off under reduced pressure, the resultant residue was subjected to re-crystallization treatment using ethyl acetate, and gel-like substance was subjected to a suction filtration, thereby obtaining 3.69 g of N-[(9-fluorenyl)methoxycarbonyl]-L-isoleucylaminooctadecane (hereinafter also referred to as "Intermediate product (1)") at the yield of 87%.

Subsequently, 32 ml of N,N-dimethylformamide (DMF) and 8 ml of piperidine were added to 3.02 g (0.005 mol) of Intermediate product (1) thus obtained, and the resultant mixture was stirred for 1.5 hours at room temperature. The solvent was distilled off under reduced pressure, the resultant residue was extracted with diethyl ether, and the organic layer was dried over anhydrous magnesium sulfate. Thereafter, the solvent was distilled off under reduced pressure, the resultant residue was purified by the silica gel chromatography, thereby obtaining 1.54 g of L-isoleucylaminooctadecane (hereinafter also referred to as "Material isoleucine derivative (1)") having the skeletal structure represented by the formula (1) at the yield of 81%.

Production Example 1 of Gelling Agent 0.45 g (0.0016 mol) of Material azobenzene derivative (1) was dissolved in 12 ml of dichloromethane under argon atmosphere, then 0.61 g (0.0016 mol) of Material isoleucine derivative (1), 24 mg (0.0002 mol) of 4-(N,N-dimethylamino)pyridine (DMAP) and 0.43 g (0.0022 mol) of 1-ethyl-3-(3-dimethylaminopropyl)carbodiimide hydrochloride (EDC) were added to the solution, and the resultant mixture was stirred for 5 days at room temperature. Then, the solvent was distilled off under reduced pressure, the resultant residue was extracted with chloroform, and the organic layer was dried over anhydrous magnesium sulfate. Thereafter, the solvent was distilled off under reduced pressure, the resultant residue was purified by the silica gel chromatography, thereby obtaining the reaction product at the yield of 58%.

From the measurement result of the nuclear magnetic resonance spectrometry (NMR), it was confirmed that the reaction product thus obtained was N-[(4'-cyanoazobenzene-4-oxy)acetyl]-L-isoleucylaminooctad ecane (hereinafter also referred to as "Isoleucine derivative (1)") of which Y is cyano group in the general formula (2).

Measurement results by the nuclear magnetic resonance spectrometry (NMR) are shown below.

$^1$H NMR (270 MHz, solution of chloroform-d1) : Chemical shift δ 8.00–7.94 (m,4H), 7.80 (d, J=8.58 Hz,2H), 7.10–7.07 (m,3H), 5.77 (m,1H), 4.61 (s,2H), 4.26 (m,1H), 3.33–3.22 (m,2H), 1.95–1.20 (m,35H), 0.98–0.85 (m,9H).

Gel forming ability of the gelling agent composed of Isoleucine derivative (1) was examined, and it was confirmed that it exhibits excellent gel forming ability to 4-pentyl-4'-cyanobiphenyl.

Confirmation of the Property of the Liquid Crystal Composition

Isoleucine derivative (1) was mixed to 4-pentyl-4'-cyanobiphenyl which was the liquid crystalline compound, as the gelling agent, thereby obtaining the gelling mixture (hereinafter also referred to as "Liquid crystal composition (1)") of 3 mass % isoleucine derivative (1) concentration.

Liquid crystal composition (1) thus obtained was sealed in the glass cell having a thickness of 5 μm, thereby producing plural Sample (1).

Ultraviolet light (hereinafter also referred to as "specific ultraviolet light") of non-polarized light having the wavelength of 365 nm was irradiated to Sample (1) produced at an irradiation angle of 90° to the substrate making up the glass cell, and the Sample (1) subjected to the ultraviolet light irradiation treatment was observed through a conoscope. As a result, a cruciform image was identified. A shape of the cruciform image identified by the conoscopic observation is shown in "c" of FIG. 4.

The conoscopic observation was also conducted to Sample (1) before conducting the specific ultraviolet light irradiation treatment, and the cruciform image was not identified.

Two substrates on the surface of which a horizontal orienting film was formed were prepared, and Sample (2) having a construction that the composition layer formed of the liquid crystal composition was formed between these two substrates was produced. The specific ultraviolet light was irradiated to Sample (2) at an irradiating angle of 90° to the substrate, and the Sample (2) thus subjected to the ultraviolet light irradiation treatment was observed through conoscope. As a result, the cruciform image of the same shape as the shape of the cruciform image identified in the conoscopic observation in above-mentioned Sample (1) was identified.

The conoscopic observation was also conducted to Sample (2) before conducting the specific ultraviolet light irradiating treatment, and the cruciform image was not identified.

From the above results, it was confirmed that Liquid crystal composition (1) related to Sample (1) and Sample (2) was such that a great number of liquid crystalline compounds are oriented to one direction by the irradiation of the ultraviolet light.

The specific ultraviolet light was irradiated to Sample (1) by variating the irradiating angle to the substrate to, 30°, 60°, 120° and 150°, and respective Sample (1) subjected to the ultraviolet light irradiation treatment was observed through the conoscope. The shapes of the cruciform images identified by conoscopic observation according to the Sample (1) subjected to the ultraviolet light irradiation treatment at the respective irradiating angles were shown along with the shape of cruciform image identified by conoscopic observation of Sample (1) subjected to the ultraviolet light irradiation treatment at the irradiating angle of 90° in FIG. 4.

Figure 4:
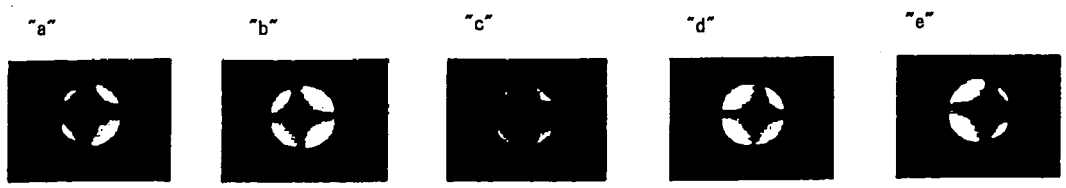
FIG. 4 is a schematic diagram illustrating the shape of the cruciform image identified by the conoscopic observation according to the Example 1.

In FIG. 4, shapes of the cruciform image in the irradiating angles of 30, 60, 120 and 150 are shown in (a) (b), (d) and (e) respectively.

From the above results, it was confirmed that Liquid crystal composition (1) according to Sample (1) was such that a great number of liquid crystalline compounds making up the Liquid crystal composition (1) are oriented to one direction parallel to the irradiating direction of the ultraviolet light in accordance with the irradiating direction.

The specific ultraviolet light was irradiated to Sample (1) at an irradiating angle of 30° to the substrate making up the glass cell and it was confirmed that the liquid crystalline compounds were oriented in a state inclined at the angle of 30° to the substrate by the conoscopic observation. Thereafter, the oriented state of the liquid crystalline compounds was confirmed over the time by the conoscopic observation while irradiating the specific ultraviolet light to this Sample (1) at an irradiating angle of 150°, and the condition of temperature of 32° C. As a result, the shape of the cruciform image identified by the conoscopic observation was gradually changed to the shape indicated as "a", "b", "c", "d" and "e" in FIG. 4, in this order, as a lapse of irradiating time of ultraviolet light, specifically, after a lapse of two hours from the start of the ultraviolet light irradiation treatment, the liquid crystalline compounds were in a state oriented perpendicularly to the substrate, and after a lapse of four hours from the start of the ultraviolet light irradiation treatment, the liquid crystalline compounds were oriented in a state inclined at the angle of 150° to the substrate.

From the above results, it was confirmed that Liquid crystal composition (1) related to Sample (1) was such that the liquid crystalline compounds making up the liquid crystal composition (1) is capable of being changed continuously in the orienting direction.

Sample (3) having a construction that the composition layer composed of Liquid crystal composition (1) was formed between two ITO substrates was produced, and the specific ultraviolet light was irradiated to this Sample (3) at the irradiating angle of 135° to the substrate. After it was confirmed that the liquid crystalline compound was oriented in a state inclined at the angle of 135° to the substrate by the conoscopic observation, the electric field was applied to this Sample (3) in a direction perpendicular to the substrate, thereby, it was confirmed that the liquid crystalline compounds were oriented in direction perpendicular to the substrate, and when the application of the electric field was stopped, the liquid crystalline compounds were oriented again in a state inclined at the angle of 135° to the substrate.

From the above results, it was confirmed that in Liquid crystal composition (1) related to Sample (3), the liquid crystalline compounds making up the Liquid crystal composition (1) was capable of being changed in the oriented direction thereof oriented by the ultraviolet light, by external stimulation other than light such as the electric field.

The invention claimed is:

1. A photo-responsive liquid crystal composition, comprising:
    a liquid crystalline compound and a gelling agent mixed with the liquid crystalline compound,
    wherein the liquid crystalline compound is capable of being controlled in a state oriented in one direction by an irradiation of light;
    wherein the gelling agent is formed of a compound having an azobenzene structural part and an isoleucine derivative represented by the following formula (2):

formula (2)

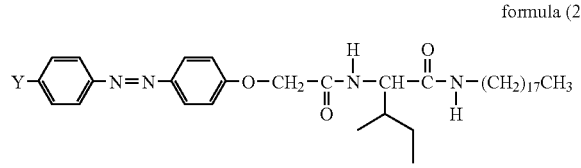

wherein Y indicates a monovalent group selected from the group consisting of a cyano group, a methoxy group, an alkyl group, a chloro group, and an iodo group.

2. The photo-responsive liquid crystal composition according to claim 1, wherein the liquid crystalline compound is oriented in a direction parallel to the direction of the irradiation of light.

3. The photo-responsive liquid crystal composition according claim 1, wherein the liquid crystalline compound is formed of a compound exhibiting a nematic phase.

4. The photo-responsive liquid crystal composition according claim 1, wherein the liquid crystalline compound is 4-pentyl-4'-cyanobiphenyl.

5. The photo-responsive liquid crystal composition according to claim 1, wherein the liquid crystalline compound is at least one selected from the group consisting of a cyanobiphenyl compound, a phenyl cyclohexane compound, a benzylideneaniline compound, a phenylbenzoate compound, a phenylacetylene compound, and a phenylpyrimidine compound.

6. The photo-responsive liquid crystal composition according to claim 1, wherein the liquid crystalline compound is at least one selected from the group consisting of 4-methoxybenzylidene-4'-butylaniline and 4-(trans-4-pentylcyclohexyl)benzonitrile.

7. The photo-responsive liquid crystal composition according to claim 1, wherein Y is a cyano group.

8. The photo-responsive liquid crystal composition according to claim 1, wherein Y is a methoxy group.

9. The photo-responsive liquid crystal composition according to claim 1, wherein Y is an alkyl group.

10. The photo-responsive liquid crystal composition according to claim 1, wherein Y is a chloro group.

11. The photo-responsive liquid crystal composition according to claim 1, wherein Y is an iodo group.

12. The photo-responsive liquid crystal composition according to claim 1, wherein the gelling agent is obtained by reacting the compound having an azobenzene structural part and an isoleucine derivative in the presence of 1-ethyl-3-(3-dimethylaminopropyl)carbodiimide hydrochloride and 4-(N,N-dimethylamino)pyridine.

13. The photo-responsive liquid crystal composition according to claim 12, wherein the compound having an azobenzene structural part and the isoleucine compound are present in the reaction in a substantially equal number of moles and the reaction is carried out in a solvent.

14. The photo-responsive liquid crystal composition according to claim 1, wherein the gelling agent is present in an amount of from 0.2 to 10.0 mass % based on the total mass of the gelling agent and the liquid crystalline compound.

15. The photo-responsive liquid crystal composition according to claim 12, wherein the 1-ethyl-3-(3-dimethylaminopropyl)carbodiimide hydrochloride is present in an amount of from 100 to 200 parts by mass per 100 parts by mass of the isoleucine compound.

16. The photo-responsive liquid crystal composition according to claim 12, wherein the 4-(N,N-dimethylamino)pyridine is present in an amount of from 5 to 20 parts by mass per 100 parts by mass of the isoleucine compound.

17. The photoresponsive liquid crystal composition according to claim 12, wherein the reaction is carried out in at least one solvent selected from the group consisting of dichloromethane, tetrahydrofuran, and N,N-dimethylformamide.

* * * * *